United States Patent [19]
Cherian

[11] Patent Number: 4,818,011
[45] Date of Patent: Apr. 4, 1989

[54] ANTI-GLARE VISOR SYSTEM

[76] Inventor: Gabe Cherian, 52 Amorok Way, Fremont, Calif. 94539

[21] Appl. No.: 49,706

[22] Filed: May 13, 1987

[51] Int. Cl.⁴ .............................................. B60J 3/02
[52] U.S. Cl. ................................... 296/97.2; 296/97.8
[58] Field of Search ................. 296/97 G, 97 F, 97 C, 296/97 R

[56] References Cited

U.S. PATENT DOCUMENTS

| | | | |
|---|---|---|---|
| 1,938,085 | 12/1933 | Page | 88/41 |
| 2,829,920 | 4/1958 | Cohen | 296/97 |
| 2,831,725 | 4/1958 | Chester | 296/97 |
| 2,831,726 | 4/1958 | Ralston | 296/97 |
| 2,855,241 | 10/1958 | Walter | 296/97 |
| 3,021,173 | 2/1962 | Levin | 296/97 |
| 3,199,114 | 8/1965 | Malifaud | 296/97 F |
| 3,363,666 | 1/1968 | Hadgson et al. | 296/97 G |
| 3,428,360 | 2/1969 | Honor | 296/97 |
| 3,445,135 | 5/1969 | Masi | 296/97 |
| 3,499,679 | 3/1970 | Olander | 296/97 C |
| 3,692,355 | 9/1972 | Hong | 296/97 G |
| 4,090,733 | 5/1978 | Altschul | 296/97 B |
| 4,195,876 | 4/1980 | Timperio | 296/97 G |
| 4,323,275 | 4/1982 | Lutz | 296/97 G |
| 4,351,557 | 9/1982 | Chary | 296/97 D |
| 4,521,047 | 6/1985 | Saxman | 296/97 K |
| 4,570,991 | 2/1986 | Lystad | 296/97 G |
| 4,606,572 | 8/1986 | Maguire | 296/95 R |

FOREIGN PATENT DOCUMENTS

| | | | |
|---|---|---|---|
| 820385 | 11/1951 | Fed. Rep. of Germany | 296/97 F |
| 1401452 | 4/1965 | France | 296/97 F |
| 1375298 | 11/1974 | United Kingdom . | |

Primary Examiner—Robert R. Song
Attorney, Agent, or Firm—T. Gene Dillahunty

[57] ABSTRACT

This invention provides anti-glare visors for drivers for sheilding the glare of on-coming headlights and the glare of headlights of following vehicles reflected in rear view mirrors. The central vision area is bordered by a shaded area on the left side, the edge of the shaded area next to the central vision area is vertical and straight, the shaded area extends to the left at an angle corresponding to the apparent angle at which the on-coming headlights pass to the left of the driver, and additional shaded areas are provided to the left and right for screening the headlight glare of following vehicles. The shaded areas may be reversed for use by drivers driving on the left side of the road. The invention also provides a kit of parts of self-adhesive shaded shapes which can be placed on regular visors to correspond to the visors of this invention.

17 Claims, 5 Drawing Sheets

ANTI-GLARE VISOR SYSTEM

FIELD OF THE INVENTION

This invention relates to anti-glare visors and related articles on motor vehicles for use at night by drivers thereof to reduce or eliminate the glare of the headlights of on-coming traffic and the glare of headlights of following vehicles reflected in the rear view mirrors. These types of visors are sometimes referred to as antidazzle visors.

BACKGROUND OF THE INVENTION

Ever since automobiles have been driven with headlights at night, there has been a problem of how to reduce the glare of oncoming headlights when meeting another automobile. One method of reducing headlight glare is by the driver wearing eyeglasses with lenses having partially shaded or opaque areas intended to block headlight glare. My copending application Ser. No. 07/049,705 filed of even date with this application and entitled "Anti-glare Eyeglasses" describes and claims eyeglasses and similar articles worn by the driver which are effective in reducing or eliminating headlight glare. The disclosure of said copending application is incorporated herein by reference. Since anti-glare eyeglasses must be worn by the driver, it is desirable to have a visor system, assembly or combination on the vehicle to screen or reduce headlight glare. A number of attempts have been made to provide visors or visor systems on vehicles which reduce or eliminate headlight glare. For example, U.S. Pat. Nos. 2,829,920 to Cohen; No. 2,831,725 to Chester; No. 2,831,726 to Ralston; No. 2,855,241 to Walter; No. 3,021,173 to Levin; No. 3,199,114 to Malifaud; No. 3,428,360 to Honor; No. 3,445,135 to Masi; No. 3,692,355 to Hong; No. 4,090,733 to Altschul; No. 4,195,876 to Timperio; No. 4,323,275 to Lutz; No. 4,351,557 to Chary; No. 4,521,047 to Saxman; No. 4,570,991 to Lystad and No. 4,606,572 to Maguire disclose various forms and configurations of visors for vehicles.

Of the various anti-glare visors in the prior art, none has satisfactorily solved the problem of headlight glare and each design contains certain deficiences and problems in actual use. For example, some are too restrictive, block too much vision and are not easily adjustable to variable road conditions. Others reduce vision in the primary field of vision. Moreover, the problem of headlight glare in rear view mirros has not been addressed satisfactorily. Therefore, it is an object of this invention to provide anti-glare visor systems and combinations for effective elimination or reduction of headlight glare.

I have observed that during night driving the driver's eyes are adapted to low light levels and are sensitive to bright light. It is believed that the pupils of the eyes are open wide and the retinas are adapted to viewing objects in dim light and are very sensitive to bright light. When exposed to a bright light, suddenly or momentarily, like an on-coming headlight, the bright light causes momentary or temporary "blindness" in at least that part of the eye and frequently in most or all of the eye, particularly when the ambient light conditions are very low and the bright light is very bright. It is believed that this momentary or temporary "blindness" is caused by the pupil closing and by over exposure of the retina while the eye is in a sensitised condition due to the low ambient light conditions. Recovery from this temporary "blindness" and a return to normal sight for the existing conditions can take a certain amount of time before road conditions ahead of the driver can be seen agains clearly enough. This results in a very dangerous condition when a driver of a motor vehicle is momentarily or temporarily "blinded" by headlight glare and cannot see normally for such a period of time, particularly when the driver is traveling at a high rate of speed. This momentary or temporary "blindness" can be caused not only from the glare from headlights of on-coming vehicles but also and independently from the glare from headlights reflected in rear view mirrors from vehicles following the driver. Therefore, it is an object of this invention to provide effective shielding in either or both cases, that is of both on-coming headlight glare and/or the glare of headlights reflected in rear view mirrors.

SUMMARY OF THE INVENTION

In one aspect this invention provides anti-glare visor system for vehicles comprising:

(a) a first shaded area being positioned adjacent to the left of a central vision area which extends substantially to the upper portion and lower portion of the vehilce windshield and which has sufficient width for the driver to have an unobstructed view, with the driver's head in normal position, of the driver's side of the roadway from at least the right side of the roadway to at least the center of the roadway and said shaded area being extended outwardly and laterally from the central vision area wherein (i) the bottom boundary or the top boundary of the shaded area is angled to substantially correspond to the apparent angle at which the headlights of on-coming traffic move past the driver, (ii) the distance between the top and bottom boundaries of the shaded area is sufficient to provide effective shielding of the glare of the headlights of the on-coming traffic as the headlights move past the driver, (iii) the boundary between the shaded area and the central vision area is substantially straight and vertical and (iv) the shaded area extends outwardly sufficiently to provide effective shielding of the on-coming traffic headlight glare substantially to the limit of the driver's peripheral vision; and (b) a second shaded area which is positioned outside the left portion of the first shaded area and which extends a sufficient amount to effectively shield the headlight glare of a following vehicle reflected in the exterior rear veiw mirròr to the left of the driver.

In another aspect this invention provides anti-glare visor system for vehicles comprising:

(a) a first shaded area being positioned adjacent to the left of a central vision area which extends substantially to the upper portion and lower portion of the vehicle windshield and which has sufficient width for the driver to have an unobstructed veiw, with the driver's head in normal position, of straight ahead traffic in the driver's side of the roadway from at least the right side of the roadway to at least the center of the roadway and said shaded area being extended outwardly and laterally therefrom wherein (i) the bottom boundary of the shaded area is angled to substantially correspond to the apparent angle at which the headlights of on-coming traffic move past the driver, (ii) the distance between the top and bottom boundaries of the shaded area is sufficient to provide effective shielding of the glare of the headlights of the on-coming traffic as the headlights move past the driver, (iii) the boundary between the shaded area and the central vision area is substantially straight and vertical and (iv) the shaded area extends outwardly sufficiently to provide effective shielding of the on-coming traffic headlight glare substantially to the limit of the driver's peripheral vision; and (b) a second shaded area which is positioned to the right side of the central vision area and which is positioned to effectively shield the headlight glare of a following vehicle reflected in a rear view mirror positioned to the right of the driver.

In one preferred aspect, the visors of this invention include both the above shaded are to shield the glare reflected in the left rear view mirror and the above shaded area to shield the glare reflected in the right rear view mirror, in addition to the first shaded area which shields the glare from on-coming traffic.

In another aspect, this invention provides the above visors in a form wherein the bottom boundaries of the shaded areas described above are positioned so that the shaded areas do not cover the on-coming traffic vision area or rear view mirror fields of the driver's vision, but are positioned such that the driver can cover those fields of the driver's vision with the shaded areas by a slight downward movement of the visors.

In another aspect, this invention provides the above visors in a form wherein the bottom boundaries of the shaded area are positioned so that the shaded areas cover the on-coming traffic or rear view mirror fields of the driver's vision and are positioned such that the driver can uncover these fields of the driver's vision by a slight upward movement of the visors.

In another aspect, this invention provides the above visors in a form wherein the bottom boundaries of the shaded areas are positioned so that each shaded area covers its respective field of vision at different times upon progressive or selective downward movement of the visors or individual visor segments. Alternatively, this invention provides the above visors in a form wherein the bottom boundaries of the shaded areas are positioned so that each shaded area uncovers its respective field of vision at different times upon progressive or selective upward movement of the visors or visor segments.

In another aspect, the visors of this invention can have the boundary between the first shaded area and the central vision area positioned further to the left than it would normally be to correspond to the above and the driver can cover and uncover the on-coming headlight and/or the respective rear view mirror fields of vision by side to side movement of the visors. In this configuration the shaded areas can also be arranged so that they can be moved to cover and uncover these fields of vision by diagonal movement, e.g., down and to the right or up and to the left, or by any desired combination of up and down, side to side or diagonal movements of the visors.

The descriptions herein are in terms of the areas as viewed by the driver looking toward and through the vehicle windshield toward the roadway.

While this invention is described in the embodiment of visors, it is to be recognized that this invention is equally applicable in the form of other embodiments of shades and similar devices which are installed in vehicles to shade or screen unwanted light from the driver's vision fields, which shades or visors incorporate the various combinations of shaded and vision areas of the configurations set forth in this invention.

In many embodiments of the present invention, the visors will be movably mounted or attached to the vehicle windshield, the windshield frame area, the door, the door post, the side window, the roof or other suitable part of the vehicle. However, in another aspect, this invention provides a kit of parts of glare shields having configurations such that they can be attached to windshields and windows to convert them to anti-glare visors or screens according to this invention as described above. These attachable glare shields may be mechanically attachable, self-adhering, self-adhesive or attachable by any other means, and they can also be attached to existing visors, the dashboard, door post or other appropriate place in order to position the glare shields in accordance with this invention. The kit of parts may include variously configured shaded strips of attachable glare shields which can be used to add or to subtract from the boundaries of any of the shaded areas according to this invention. For example, such strips could be added to or removed from the bottom of the above first shaded area to change the apparent angle of that shaded area, as may be needed by the driver when that driver moves the visors from one vehicle to another, for example from a sports car to a truck. The total area and boundaries of any of the shaded areas of this invention can be so modified, including enlarging the shaded areas of visors which have permanent shaded areas. Any such kit of parts will also be useful on motorcycle windshields or wind screens where the attachable shaded glare shields can be applied to shade or screen the desired vision area according to this invention.

DESCRIPTION OF THE INVENTION

The first feature of the anti-glare visors of the present invention is that there are no shaded areas above or below the central vision area of the driver. This allows the driver to lower or raise the visors of this invention relative to the driver's line of sight without obstructing the primary or central vision area. This central vision area is positioned so that it extends at least from the right side of the roadway to at least the center of the roadway. This allows the driver unobstructed vision of the portion or lane of the roadway on which the driver is driving, as well as traffic lights and other important road signs that may be overhead. It should be noted, however, that the central vision area need not extend all the way to the top or bottom of the windshield area.

The second feature of the anti-glare visors of the present invention is that the shaded area positioned to the left of the central vision area has a bottom boundary or a top boundary which is positioned at an angle which corresponds to the apparent angle at which the on-coming headlights move past the driver and has a substantially straight and vertical edge or boundary between it and the left edge of the central vision area. While the other (top or bottom) boundary of this shaded area need not be positioned at the apparent angle, the height of this shaded area is to be sufficient to effectively screen the on-coming headlights as they pass the driver. The "apparent angle" at which the bottom boundary or the top boundary of this shaded area is positioned will vary according to the height of the driver above the roadway and is determined by the apparent path or track the on-coming headlights follow as they approach and pass the driver on the left. As percieved by the driver, the on-coming headlights first appear straight ahead and on the horizon, i.e., level with the driver's eyes. The on-coming headlights then approach and pass to the left of the driver at a height below the driver's eyes. The angle between this apparent path or track of the headlights from the horizon to the left of and below the level of the driver's eyes and a horizontal reference line is the "apparent angle" referred to in this invention. This explanation is for a normal car or truck; the angle can be an angle above the horizontal, as explained in the further description of this invention and in the drawings. As measured down from the horizontal, the apparent angle will be greater for the driver of a truck than for the driver of an automobile, because the truck driver's eyes are higher above the roadway than the automobile driver's eyes. For the driver of a low sports car the apparent angle may be zero, i.e., horizontal, or even negative, i.e., an angle above the horizontal, which will be the case where the driver's eyes are at a level below the level of the on-coming headlights and where the on-coming headlights of normal sized cars, trucks and the like pass on the left of the driver at a level above the horizontal level of the sports car driver's eyes. The apparent angle will be greater for a motorcycle rider than for the driver of an automobile and usually less than for a driver of a truck or bus. When the bottom boundary of this shaded area is positioned at the apparent angle, the shaded area is used by positioning the shaded area above the on-coming vehicle headlights and lowering the shaded area to screen the glare from those headlights when desired and raising the shaded area when the screening is not desired. When the top boundary of this shaded is positioned at the apparent angle, the shaded area is used by positioning the shaded area below the on-coming vehicle headlights and raising the shaded area to screen the glare from those headlights when desired and lowering the shaded area when the screening is not desired. Of course, if the top and bottom boundaries are both positioned at the apparent angle, then the shaded area can be used above or below the vision area the driver desires to screen.

It is an important feature of this first shaded area that the right edge or boundary be substantially straight and vertical, so that the driver can move the vertical position of the visor of this invention relative to the driver's line of sight by raising or lowering the visor without unintentionally covering or shading a desired line of sight in the central vision area. If the edge or boundary of this shaded area is angled, curved or irregular, as in some of the prior art, it is more difficult for the driver to quickly shade or screen the exact area or line of vision in which the driver desires to reduce or eliminate the glare of on-coming headlights without impairing the driver's vision in his or her driving lane. The present invention allows precise screening of a desired area by the driver by using simple or single movements, compared to the complex and sometimes unpredictable movements required by some of the prior art visors. For example, this invention also allows easy adjustment to on-coming headlight glare on curved roads. Since the boundary between the left edge of the central vision area and the shaded area to the left side of the central vision area is vertical, the driver can easily keep that boundary positioned on the centerline of the roadway at any point on the roadway ahead, by moving the visor slightly to the left or right as needed to follow the curves in the roadway ahead.

Another important feature of this invention resides in the feature of the bottom boundary of the first shaded area being positioned at an angle substantially corresponding to the apparent angle at which the headlights of the on-coming traffic moves past the driver. This bottom boundary will normally be positioned so that it just covers the path of the headlights and screens the glare of those headlights, which allows the driver to then uncover that path or area of vision by slightly raising the visors relative to the driver's line of vision. However, in rainy conditions the glare of on-coming headlights is frequently reflected on the wet roadway and the reflection has the same blinding effect on the driver's vision as the headlights themselves. In this situation the headlights glare from the reflection is shining at the driver and passes the driver at approximately the same apparent angle as the headlights themselves, but is coming from a lower position compared to the headlights themselves, namely the roadway surface. The present invention allows the driver to effectively shade or shield that lower area merely by quickly and easily moving the visors of this invention down until hthat lower area of reflection from the roadway surface is covered by said first shaded area without in any way obstructing or interferring with the main central vision area. This is in part made possible by the present invention because of the unobstructed central vision area and by the vertical boundary of the first shaded area at the central vision area. A driver may want to have separate visors according to this invention for dry weather and for rainy conditions, or may want to have attachable or adjustable shaded strips to change the lower boundary of the first shaded area to correspond to the reflected headlight glare on wet roadways. While the visors fo this invention can easily be used in both dry and wet conditions, such separate visors or attachable strips may be desired in order to avoid having to hold or repeatedly adjust the position of the visors to the lowered position for wet roadway conditions. The above advantages are equally realized when the top boundary of the first shaded area is the boundary positioned substantially at the apparent angle.

The next feature of the visors of the present invention is a second shaded area positioned to shade or screen the glare of the headlights of a following vehicle reflected in one or more rear view mirrors. This second shaded area will usually preferably be on the left side of the visor and will be positioned above, below or to the left of the first shaded area, depending on the position of the rear view mirros being used by the driver and can be adjacent to, contiguous with or separate from the left portion of the first shaded area, as dictated by the position of the rear view mirror. This second shaded area can also preferably be positioned on the right side of the central vision area and positioned to correspond to the position of the right-hand rear view mirror being used by the driver, such as an interior mirror positioned in the center of the vehicle or an exterior mirror positioned on the right side of the vehicle or both. These second shaded areas, whether on the left or on the right can be attached to the visor having the first shaded area or can be separate shaded shaded areas which are attached to the vehicle or to both the first visor and the vehicle.

In a preferred form, the visors of the present invention include such a second shaded area positioned toward the left side of the first shaded area and a third such shaded area positioned on the right side of the central vision area, as described above to screen both left-hand and right-hand rear view mirrors as well as on-coming headlight glare.

The bottom edge or boundaries of the shaded areas of the visors of the present invention are preferably positioned so that when the driver changes the position of the visors relative to the drivers line of vision while driving by raising or lowering the visors the shaded areas can all cover their respective intended areas at the same time or can cover their respective intended area selectively, sequentially or individually. For example, the driver may wish to screen the rear view mirror areas of vision by moving the visors to a certain position without screening the area of vision where the headlight glare of the on-coming traffic appears until actually meeting an on-coming vehicle. Then the driver can also screen that area of on-coming headlights when desired, for example by lowering the visors to the desired level.

In some preferred configurations, the visors of the present invention provide additional advantages where the shaded areas are positioned above or can be raised by the driver above the driver's normal fields of vision. This provides added safety in that the shaded areas do not cover or obstruct any normal field of vision, until a field of vision has unwanted headlight glare enter into that field and the driver positions a shaded area to screen the glare in that field. Otherwise, the driver's normal field of vision is unaffected by the visors of this invention. This can be particularly important when proceeding from stop signs and when looking for other traffic (e.g., when changing lanes or merging) or for signs, traffic lights and the like. It is also important to note that the central vision area of the visor system of this invention allows unobstructed view of the instrument panel and dashboard of the vehicle, and positioning the shaded areas according to these preferred configurations can assure that the entire instrument panel or dashboard of the vehicle is visible to the driver at all times.

Figure 1:
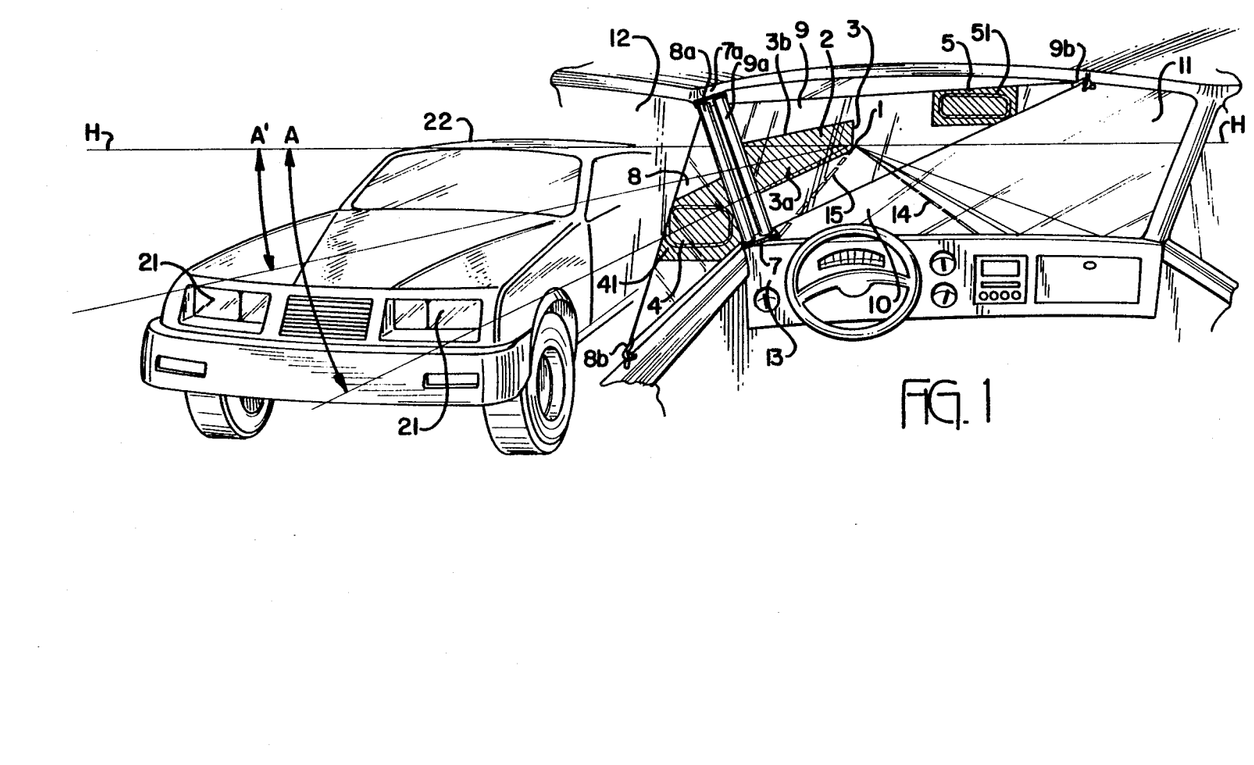
FIG. 1 shows a perspective forward view as seen by a driver of an ordinary automobile through an embodiment of the anti-glare visor system of this invention.

The visors of this invention can be more clearly illustrated by referring to the embodiments shown in the drawings. FIG. 1 shows a perspective forward view of the roadway 10, windshield 11, side window 12, instrument panel 13 and mirrors 41 and 51, as seen by a driver of an automobile through an embodiment of the visors of this invention. In this embodiment the shaded areas 2, 4 and 5 of the visors are on transparent sheets 8 and 9 which are wound on spring-tensioned rollers 8a and 9a mounted on door post 7. Transparent sheets 8 and 9 are extended from rollers 8a dn 9a and secured in the desired position by hooks 8b and 9b or other suitable means. Central vision area 1 extends from the top of the windshield 11 to the bottom of the windshield 11. While it is preferred in many instances that the central vision area 1 extend from the top of the windshield to the bottom of the windshield, the windshiled may have other areas thereon in the upper or lower portions of the windshield, such as shading or other opaque visors, provided that the central vision area in the central portion of the windshield is substantially unobstructed.

Shaded area 2 extends latterly to the left from the left side of central vision area 1 and the bottom boundary 3a of shaded area 2 is at apparent angle A with respect to the horizontal, H, which corresponds to the angle at which the on-coming headlights 21 of vehicle 22 pass to the left of the driver. Shaded area 2 has boundary 3 which is substantially straight and substantially vertical and positioned at the left side of the central vision area 1. The vertical height of shaded area 2 is sufficient to effectively screen the glare of on-coming headlights 21 and the height may vary along the length of the shaded area 2. For example, shaded area 2 may be smaller in height near the central vision area 1 and larger in height toward the left portion of the shaded area 2 in order to effectively screen the glare of the on-coming headlights 21 as they appear larger and larger as they approach and pass the driver, while still providing effective screening near the central vision area 1 for headlights which are more distant from the driver. The top boundary 3b of shaded area 2 may extend to the top of the windshield 11 or the top of sheet 9, if desired, but it is generally preferred that the shaded area 2 only be of a height, varied or constant, which is necessary for effectively screening the glare of the on-coming headlights 21. The top boundary 3b may be positioned at any desired angle or position, provided it is above angle A' in FIG. 1, so that shaded area 2 provides the desired overall screening of on-coming headlight glare. It should also be noted that shaded area 2 need only extend to the left far enough to provide the desired areas of screening, which may be to the left edge of windshield 11 or may extend into the area of side window 12 and, in this embodiment, onto sheet 8.

Shaded area 4 is positioned to screen the glare of the headlights of a following vehicle being reflected in the left-hand rear view mirror 41 and shaded area 5 is positioned to screen the glare of the headlights of a following vehicle being reflected in the right-hand rear veiw mirror 51. Either or both of shaded areas 4 and 5 may be used in the anit-glare visor system of this invention and may be positioned as necessary to be effective for the particular rear view mirrors being used by the driver.

Figure 2:
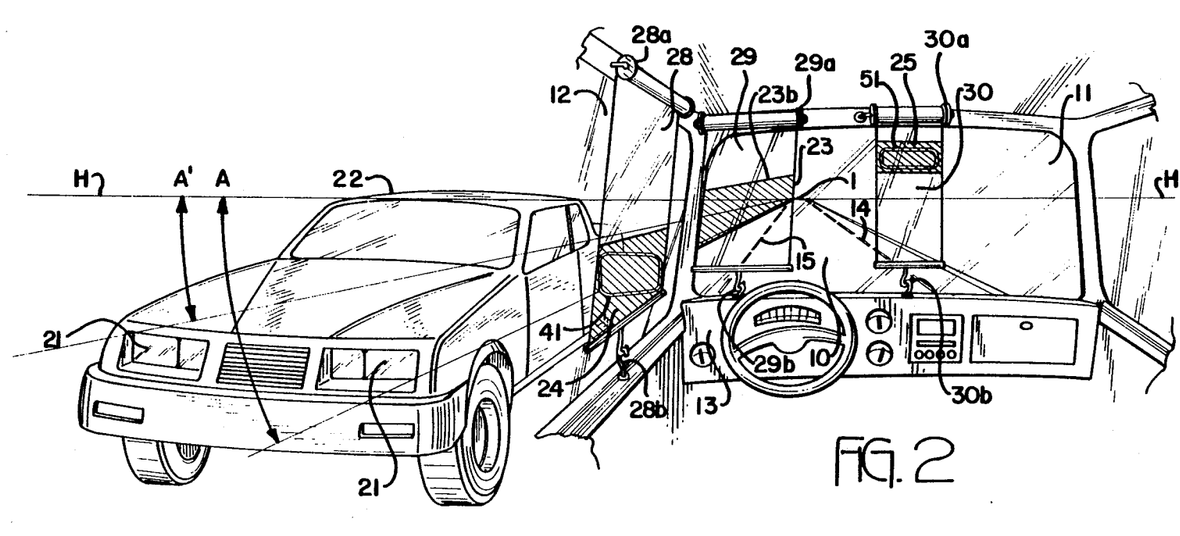
FIG. 2 shows a perspective forward view as seen by a driver of an ordinary automobile through another embodiment of the anti-glare visor system of this invention.

FIG. 2 is a perspective view of the roadway as seen by the driver of an automobile through another embodiment of the anti-glare visor system of this invention and shows the apparent angle A at which the on-coming headlights 21 pass to the driver's left. In the embodiment shown in FIG. 2 shaded areas 20, 24 and 25 are on transparent sheets 28, 29 and 30 which are wound on spring tensioned rollers 28a, 29a and 30a respectively. Each transparent sheet and the shaded area thereon or therein is extended from the roller and secured in the desired position with hooks 28b, 29b and 30b or other suitable means. As in the embodiment in FIG. 1, shaded area 2 may extend onto sheet 28 if desired, and the boundaries 23, 23a and 23b of shaded area 20 have the same characteristics as boundaries 3, 3a and 3b, respectively, in FIG. 1.

Figure 3:
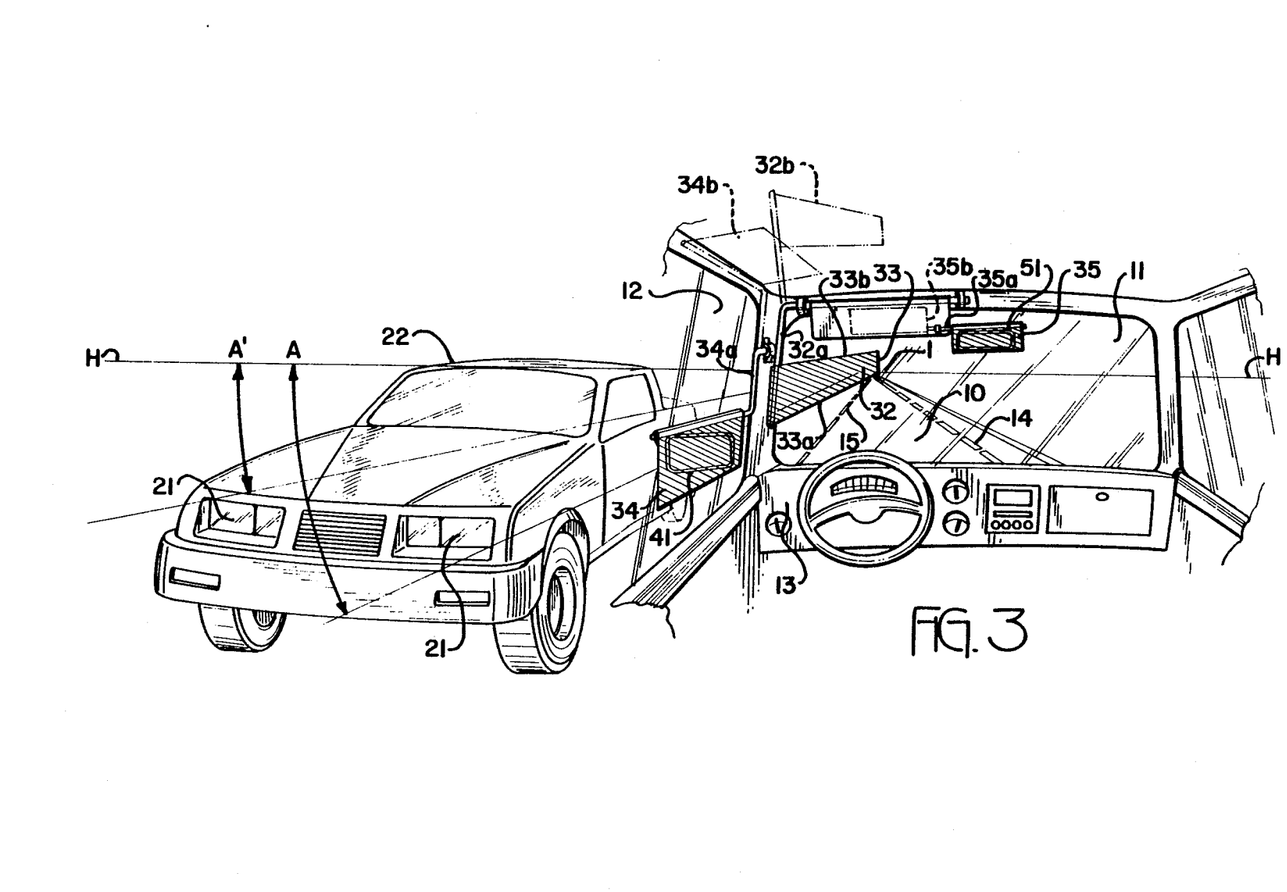
FIG. 3 shows a perspective forward view as seen by a driver of an ordinary automobile through another embodiment of the anti-glare visor system of this invention.

FIG. 3 is a perspective view of the roadway as seen by the driver of an automobile through another embodiment of the anti-glare visor system of this invention. In this embodiment shaded areas 32, 34 and 35 are in the form of pivotable visors attached by arms 32a, 34a and 35a, respectively, to the vehicle or the conventional visor in the vehicle. These shaded areas can be folded or pivoted out of the way and stored until needed as shown by dotted-line positions 32b, 34b and 35b, respectively. As in the embodiment in FIG. 1, shaded area 32 may extend to the left of arm 32a if desired, and the boundaries 33, 33a and 33b of shaded area 32 have the same characteristics as boundaries 3, 3a and 3b, respectively, in FIG. 1.

In embodiments illustrated in FIGS. 1, 2 and 3 the shaded areas can be lowered or pulled into the desired position by the driver to cause the shaded areas to screen the glare of on-coming headlights 21 and the glare of headlights reflected in rear view mirrors 41 and 51 in any order or sequence desired. Alternatively, it should be noted that in some embodiments of this invention, as in FIGS. 2 and 3, it is convenient for the shaded areas 20 or 32 of this invention to be moved vertically and positioned so they cover or screen the areas desired by the driver. In this case the driver can cover or uncover the desired vision areas by vertically lowering or raising the visor or sheet containing the shaded area without screening or interferring with the central vision area 1. This is made possible by the aspect of this invention wherein shaded areas 2, 20 and 32 boundaries 3, 23 and 33 in FIGS. 1, 2 and 3 embodiments, respectively, are substantially straight and vertical. These straight and vertical boundaries also make it easy for the driver to alter predictably the exact vision area he or she desires to screen with the shaded area by moving his or her head slightly, for example on a curved road the straight and vertical boundary can be kept positioned by the driver on the center of the roadway by moving the driver's head or by moving the visor or sheet containing the shaded area. The straight and vertical boundaries assure unobstructed vision of roadway 10 from at least the right side 14 of roadway to at least the center 15 of roadway 10.

In the description of the present invention, it is intended that reference to the driver raising or lowering the visor or sheet containing the shaded areas is intended to include any method chosen by the driver to do so, whether it be by raising or lowering the visors manually, electrically or the like by the driver relative to the driver's line of sight toward the roadway for example by raising or lowering the functional shaded area relative to a visors frame or bracket holding the shaded areas of the visor system or by the driver moving his or her head, or by other methods selected by the driver.

It should further be noted that this invention is described in terms of the bottom boundary 3a, 23a or 33a of visor shaded areas 2, 20 and 32, respectively, being angled at the apparent angle, but this invention can also be utilized by the top boundary 3b, 23b or 33b of shaded areas 2, 20 or 32, respectively, being at the apparent angle A' and the shaded area positioned below the path of the on-coming headlight glare so that the driver can simply raise the shaded area 2, 20 or 32 by slight movement to screen the glare of the on-coming headlights 21. In such an embodiment the apparent angle for top boundary 3a will be positioned at angle A' in FIG. 1 and the position of bottom boundary 3a will not be important so long as it is positioned below angle A. The same is true for other such embodiments with respect to angles B and B' in FIG. 4 and angles C and C' in FIG. 5. In such embodiments, shaded areas 2, 20 or 32 should be the minimum height, top to bottom, as possible and still provide the desired headlight glare screening without obscuring any more of the instrument panel than necessary when shaded area 2, 20 or 32 is lowered.

However, it is preferred to use the embodiment of this invention in which the bottom boundary of shaded area 2, 20 or 32 is positioned at the apparent angle A and shaded area 2, 20 or 32 is positioned above the apparent path of the on-coming headlights, then lowered by slight movement when it is desired to screen the glare of the on-coming headlights. This preferred embodiment leaves the driver's view of the instrument panel of the vehicle completely unshaded and unobstructed at all times.

It should be noted that the embodiments shown in the drawings are preferred embodiments and are not representative of the scope of this invention. For example the shaded areas of the visors of this invention need not be positioned so that the areas are screened sequentially, as described above, buy may be positioned so that the areas are screened separately or simultaneously or in any order desired by the driver or for a particular use, vehicle or driving condition encountered by the driver. It is important that the central vision area 1 be unobstructed, that the shaded area 2 have bottom boundary 3a positioned at the apparent angle A, as illustrated, and that the shaded area 2 have substantially straight and vertical boundary 3 adjacent to the left side of the central vision areas 1. It is preferred in addition that at least one rear view mirror area be screened by the shaded areas of the visor system of this invention.

Figure 4:
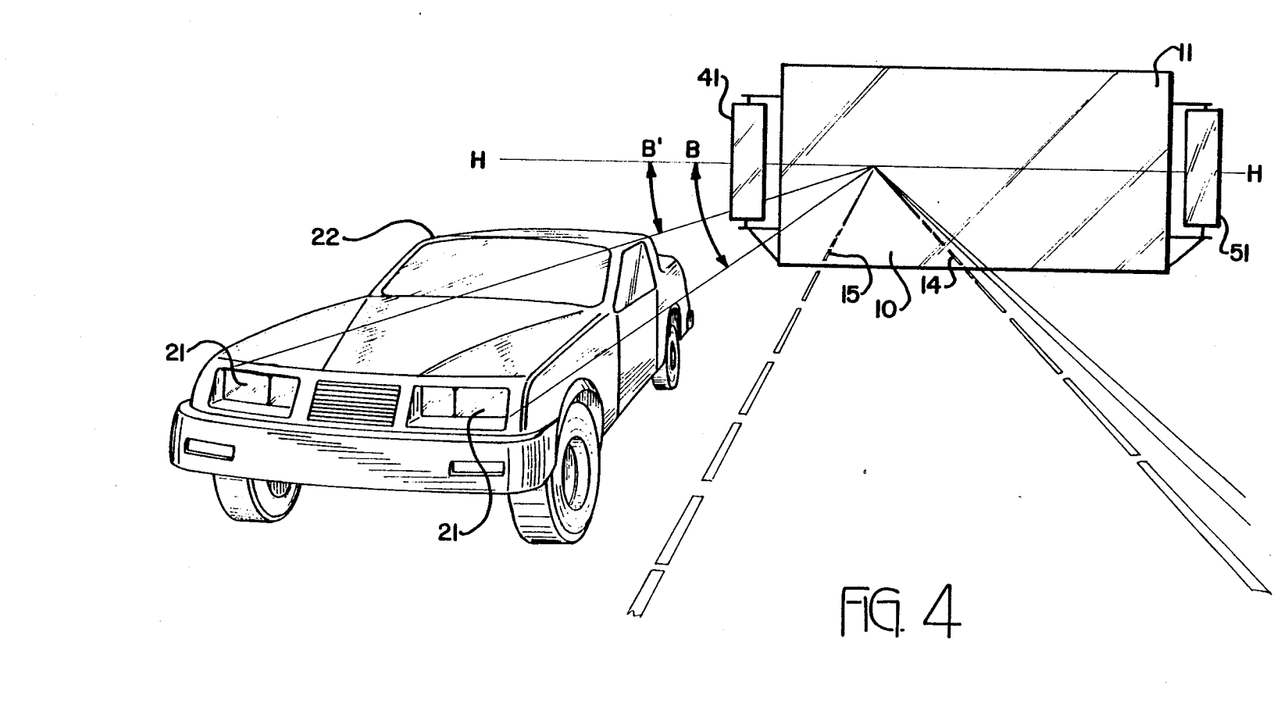
FIG. 4 shows a perspective forward view as seen by a driver of a large truck.

FIG. 4 shows the perspective view as seen by the driver of a tall truck or bus and shows the apparent angle B of the on-coming headlights 21, with respect to the reference horizontal line H, as seen by the driver of the truck or bus. As can be seen, the apparent angle B is larger for the truck driver than is the apparent angle A for the driver of an automobile.

Figure 5:
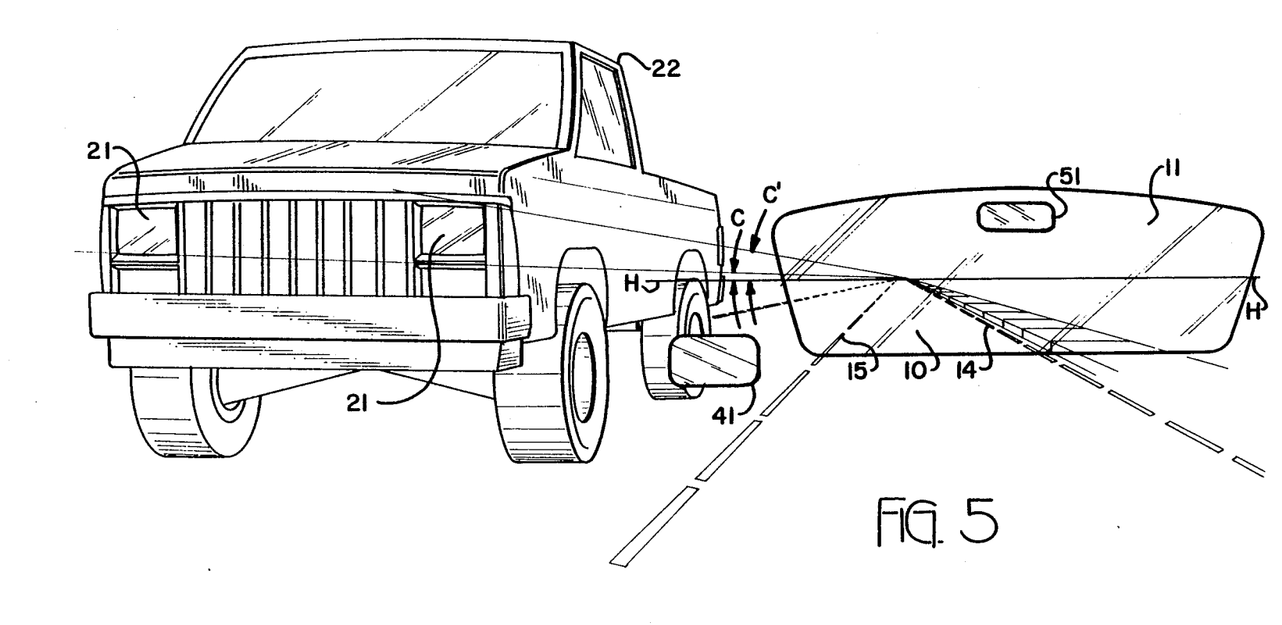
FIG. 5 shows a perspective forward view as seen by a driver of a low sports car.

FIG. 5 shows the perspective view as seen by the driver of a low sports car and shows the apparent angle C of the on-coming headlights 21 as seen by the driver the sports car. It should be noted that the apparent angle C can be an angle above the horizontal reference line H, and that the bottom edge or boundary 3a of shaded area 2 of the visors of this invention will correspond to that apparent angle C for the driver of the sports car in order to effectively screen the glare of on-coming headlights for that driver to leave the maximum view unrestricted.

This invention has been described using the term "visors", which is intended to include not only conventional visors but other forms of visors which can be attached to vehicles such as cars, trucks, buses, motorcycles and the like. For example, visors attached to motorcycle windshields are included within the scope of the term "visors" for purposes of describing and claiming the present invention. All that is required is that the visors be positioned and have a shaded area having a bottom or top boundary at the apparent angle according to this invention, have a substantially straight and vertical boundary adjacent to central vision area 1 and the areas of vision be shaded as disclosed herein. Similarly, this invention has been described primarily in terms of drivers of motor vehicles and obscure the visors of this invention are primarily useful for and intended for drivers, of course, passengers can use the visors of this invention to great advantage on their side of the vehicle as well to reduce eye strain and for other purposes.

In the description of this invention, reference is made to the upward or downward movement of the visors. It is intended that this movement is described as relative to the driver's line of sight and can be accomplished in any manner appropriate and preferred by the driver, such as moving the driver's head, by raising or lowering the visors or by any other method.

The description of this invention has been relative to drivers operating vehicles on the right side of the roadway. It is to be understood that the visors of this invention are equally applicable in the reverse or mirror image configuration for use by drivers driving on the left side of the roadway. That is, the left and right configurations described above are reversed in a mirror image configuration of the visors for driving on the right side of the roadway to provide visors for driving on the left side of the roadway and screening headlight glare passing the driver on the right side as well as screening rear view mirror glare as described herein.

This invention is equally applicable to add-on visors, i.e., glare shields which clip on or attach to existing visors, as it is to the regular visors. The add-on visors can be made with the shaded areas positioned according to this invention when clipped on the existing vehicle visors when desired for use at night. In addition, the kit of parts of attachable glare shields described herein, including mechanically attachable, self-adhering or self-adhesive types, can be applied to the add-on visors as well to produce the shaded areas positioned according to this invention. Also, the kit of parts of such attachable glare shields can be attached directly to the vehicle, e.g., frame, door frame, windshield, side window, etc., to form the visor system and shaded areas according to the present invention.

The materials used for the shaded areas of the visors of this invention can be any known material which provides the desired shading in the desired degree and pattern. The shading may be from plastic, glass or other material, may be polarized, mirrored uniaxial, unidirectional or otherwise oriented and may be fixed or variable intensity, like sunglasses that darken in brighter sunlight. The degree of shading should preferably be only dark enough for eliminating the unwanted glare from the on-coming headlights or the headlights in the rear view mirrors while leaving the headlights visible to the driver through the shaded areas. This is an important safety aspect. Eliminating the undesired glare will improve the driver's overall night vision and having the headlights visible to the driver through the shaded areas assures that the driver is aware of the presence and position of the other vehicles at all times. The intensity or degree of the shading can be variable, such as by electrically controlled liquid crystal which can be caused to darken or become transparent by application on electrical current or voltage. Each shaded area may be uniform in shading or may be darker in one part or portion of the area than in other parts or portions. For example, the first shaded area can be lighter near the central vision area, because the intensity of the on-coming headlights is less at the further distance, and can be darker toward the left, because the intensity of the headlights increases as the on-coming headlights come closer and pass by the driver. Conversely, some drivers may prefer to have the first shaded area darker near the central vision area and lighter to the left, because the glare is less bothersome as the on-coming headlights move more and more toward the peripheral vision of the driver. The second and third shaded areas can likewise have varied shading according to the preferences of the driver.

One skilled in the art will recognize that many variations and embodiments of the present invention can be made within the scope of this invention reflected by the following claims.

I claim:

1. Anti-glare visor system for vehicles comprising:
   (a) a first shaded area being positioned adjacent to the left of a central vision area which extends substantially to the upper portion and lower portion of the vehicle windshield and which has sufficient width for the driver to have an unobstructed view, with the driver's head in normal position, of the driver's side of the roadway from at least the right side of the roadway to at least the center of the roadway and said shaded area being extended outwardly and latterally therefrom wherein (i) the bottom boundary of the shaded area is angled to substantially correspond to the apparent angle at which the headlights of on-coming traffic move past the driver, (ii) the distance between the top and bottom boundaries of the shaded area is sufficient to provide effective shielding of the glare of the headlights of the on-coming traffic as the headlights move past the driver, (iii) the boundary between the shaded area and the central vision area is substantially straight and vertical and (iv) the shaded area extends outwardly sufficiently to provide effective shielding of the on-coming traffice headlight glare substantially to the limit of the driver's peripheral vision; and
   (b) a second shaded area which is positioned to the left of the first shaded area and which extends a sufficient amount to effectively shield the headlight glare of a following vehicle reflected in the exterior rear view mirror to the left of the driver.

2. Anti-glare visor system according to claim 1 further comprising
   (c) a third shaded area which is positioned to the right of the central vision area and which extends a sufficient amount to effectively shield the headlight glare of a following vehicle reflected in a rear view mirror positioned to the right of the driver.

3. Anti-glare visor system according to the claim 1 wherein the bottom boundaries of the shaded areas are positioned so that the shaded areas do not cover the on-coming traffic or mirror fields of the driver's vision and are positioned such that the driver can cover those fields of the driver's vision with the shaded areas by a slight movement of the visors.

4. Anti-glare visor system according to claim 2 wherein the bottom boundaries of the shaded areas are positioned so that the shaded areas do not cover the on-coming traffic or mirror fields of the driver's vision and are positioned such that the driver can cover those fields of the driver's vision with the shaded area by a slight movement of the visors.

5. Anti-glare visor system according to claim 3 wherein the bottom boundaries of the shaded areas are positioned so that each shaded area covers its respective field of vision at different times upon progressive movement of the visors.

6. Anti-glare visor system according to claim 4 wherein the bottom boundaries of the shaded areas are positioned so that each shaded area covers its respective field of vision at different times upon progressive movement of the visors.

7. Anti-glare visor system according to claim 1 wherein the bottom boundaries of the shaded areas are positioned so that the shaded area cover the on-coming traffic and mirror fields of the driver's vision and are positioned such that the driver can uncover those fields of the driver's vision from screening by the shaded areas by a slight movement of the visors.

8. Anti-glare visor system according to claim 2 wherein the bottom boundaries of the shaded areas are positioned so that the shaded areas cover the on-coming traffic and mirror fields of the driver's vision and are positioned such that the driver can uncover those fields of the driver's vision from screening by the shaded areas by a slight movement of the visors.

9. Anti-glare visor system according to claim 7 wherein the bottom boundaries of the shaded areas are positioned so that each shaded area uncovers its respective field of vision at different times upon progressive movement of the visors.

10. Anti-glare visor system according to claim 9 wherein the bottom boundaries of the shaded areas are positioned so that each shaded area uncovers its respective field of vision at different times upon progressive movement of the visors.

11. Anti-glare visor system for vehicles comprising:
(a) a first shaded area being positioned adjacent to the left of a central vision area which extends substantially to the upper portion and lower portion of the vehicle windshield and which has sufficient width for the driver to have an unobstructed view, with the driver's head in normal position, straight ahead traffic in the driver's side of the roadway from at least the right side of the roadway to at least the center of the roadway and said shaded area being extended outwardly and laterally therefrom wherein (i) the bottom boundary of the shaded area is angled to substantially correspond to the apparent angle at which the headlights of on-coming traffic move past the driver, (ii) the distance between the top and bottom boundaries of the shaded area is sufficient to provide effective shielding of the glare of the headlights of the on-coming traffic as the headlights move past the driver, (iii) the boundary between the shaded area and the central vision area is substantially straight and vertical and (iv) the shaded area extends outwardly sufficiently to provide effective shielding of the on-coming traffic headlight glare substantially to the limit of the driver's peripheral vision; and
(b) a second shaded area which is positioned to the right side of the central vision area and which extends a sufficient amount to effectively shield the headlight glare of a following vehicle reflected in a rear view mirror positioned to the right of the driver.

12. Anti-glare visor system according to claim 11 wherein the bottom boundaries of the shaded areas are positioned so that the shaded areas do not cover the on-coming traffic or mirror fields of the driver's vision and are positioned such that the driver can cover those fields of the driver's vision with the shaded areas by a slight movement of the visors.

13. Anti-glare visor system according to claim 12 wherein the bottom boundaries of the shaded areas are positioned so that each shaded area covers its respective field of vision at different times upon progressive movement of the visors.

14. Anti-glare visor system according to claim 11 wherein the bottom boundaries of the shaded areas are positioned so that the shaded areas cover the on-coming traffic and mirror fields of the driver's vision and are positioned such that the driver can uncover those fields of the driver's vision from screening by the shaded areas by a slight movement of the visors.

15. Anti-glare visor system according to claim 11 wherein the bottom boundaries of the shaded areas are positioned so that each shaded area covers its respective field of vision at different times upon progressive movement of the visors.

16. A kit of parts comprising attachable glare shield having configurations and being adapted so that said shields can be applied to a vehicle to provide shade areas as defined in any of claims 1–15.

17. Anti-glare visor system according to claims 1 or 11 wherein the left and right arrangements are reversed.

* * * * *